US009652351B2

(12) United States Patent
Srivastava et al.

(10) Patent No.: US 9,652,351 B2
(45) Date of Patent: May 16, 2017

(54) SYSTEM TO DETECT CHARGER AND REMOTE HOST FOR TYPE-C CONNECTOR

(71) Applicant: Intel Corporation, Santa Clara, CA (US)

(72) Inventors: Amit Kumar Srivastava, Penang (MY); Karthi R. Vadivelu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 14/582,160

(22) Filed: Dec. 23, 2014

(65) Prior Publication Data
US 2016/0179648 A1    Jun. 23, 2016

(51) Int. Cl.
| *G06F 3/00* | (2006.01) |
| *G06F 11/30* | (2006.01) |
| *G06F 13/42* | (2006.01) |
| *G06F 13/40* | (2006.01) |
| *G06F 13/38* | (2006.01) |
| *H02J 7/00* | (2006.01) |

(52) U.S. Cl.
CPC ........ *G06F 11/3051* (2013.01); *G06F 13/387* (2013.01); *G06F 13/4077* (2013.01); *G06F 13/4295* (2013.01); *H02J 7/0052* (2013.01); *H02J 2007/0062* (2013.01)

(58) Field of Classification Search
None
See application file for complete search history.

(56) References Cited

U.S. PATENT DOCUMENTS

| 2007/0035276 | A1 | 2/2007 | Webjorn | |
| 2010/0070659 | A1* | 3/2010 | Ma | G06F 13/385 |
| | | | | 710/14 |
| 2010/0201308 | A1 | 8/2010 | Lindholm | |
| 2011/0013624 | A1 | 1/2011 | Lerzer et al. | |
| 2011/0145445 | A1* | 6/2011 | Malamant | G06F 1/3203 |
| | | | | 710/16 |
| 2012/0030381 | A1 | 2/2012 | Singh et al. | |
| 2013/0300343 | A1* | 11/2013 | Files | H02J 7/0055 |
| | | | | 320/103 |
| 2015/0346790 | A1* | 12/2015 | Talmola | G06F 1/266 |
| | | | | 710/104 |
| 2016/0043586 | A1* | 2/2016 | Wang | H02J 7/0052 |
| | | | | 320/107 |

OTHER PUBLICATIONS

'Universal Serial Bus Type-C Cable and Connector Specification.' Release 1.0 USB 3.0 Promoter Group. Aug. 11, 2014 Retrieved from: http://www.those.ch/designtechnik/wp-content/uplloads/2014/08/USB-Type-C-Specification-Release-1.0.pdf; 171 pages.
International Search Report, PCT Application No. PCT/US2015/054132, Mailed date Apr. 22, 2016, 3 pages.

* cited by examiner

*Primary Examiner* — David E Martinez
(74) *Attorney, Agent, or Firm* — International IP Law Group, P.L.L.C.

(57) ABSTRACT

The present techniques include detecting a charger and remote host for a Type-C connector. An apparatus, system, and method are described herein. The apparatus comprises a USB Type-C port and a USB receiver detector. A charger and a remote host are differentiated based on the USB receiver detector.

23 Claims, 7 Drawing Sheets

SYSTEM TO DETECT CHARGER AND REMOTE HOST FOR TYPE-C CONNECTOR

TECHNICAL FIELD

This disclosure relates generally to port configuration in response to device detection. Specifically, this disclosure relates to differentiation between a charger and remote host when multiple ports share a device controller.

BACKGROUND

A Type-C Universal Serial Bus (USB) connector is a USB connector that is smaller than previous USB connectors and that enables a connection with a USB receptacle with flipping enabled. In some cases, the Type-C USB connector is a primary charging connector of the USB device. In a system with multiple USB ports, each port may share a single device controller. For example, a first USB device may be in device mode and mapped to the device controller, while a second device is attempting to connect to the system in a functional manner, such as a USB host, USB device, or a remote host.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Type-C USB connectors enable a connection with a USB device in multiple cable orientations. The USB Type-C port may be a multi-mode port that can support a number of different protocols. Such protocols may include: a Peripheral Component Interconnect (PCI) Express (PCIe) Specification, such as the PCIe 3.0 released on Nov. 10, 2010; a Universal Serial Bus (USB) Specification, such as the USB 3.1 Specification released on Jul. 26, 2013, or a Serial ATA (SATA) Specification, such as the SATA 3.2 Specification released in August 2013. Although USB is described herein, it is used as an example as any input/output (I/O) protocol may be used. In the case of a system with multiple USB ports, one device controller may control the operation of several USB ports. The device controller can enable connectivity between the device and other resources in the system. For example, the device controller may provide interfaces for data communication and power delivery functionality. The device controller may also support various operational modes for a USB device connected to the system. The operational modes include an accessory mode, alternate mode, audio adapter accessory mode, debug accessory mode, and an alternate mode.

When a port of the system is coupled with a simple charger via a Type-C connector, the USB Type-C connector is configured into an upstream facing port (UFP) based on the configuration channel (CC) detection as defined in USB Type-C Specification 1.0, released Aug. 11, 2014. As used herein a simple charger is a charger that does not support USB Power Delivery according to the USB Power Delivery Specification, Revision 2.0, released Aug. 11, 2014. A simple charger also presents itself as a downstream facing port (DFP) to the system and does not have any host capability. According to the USB Type-C Specification, the Type-C port connected to the simple charger is assigned to the device controller when the device controller is not mapped to any other port. While the simple charger is attached, CC detection gives an indication of the DFP attached as a simple charger, but does not indicate the type of DFP. Accordingly, the simple charger may tie up resources of the system as a host, hub, device, or any USB component associated with the flow of data in a USB connection. A device that is connected subsequent to when the simple charger is mapped to the device controller may not access the device controller until after the simple charger is detached.

Embodiments described herein enable a system to detect a charger and a host connected to a Type-C connector. A device controller may support a plurality of USB ports. In embodiments, an apparatus comprises a USB Type-C port and a USB receiver detector. A charger and a remote host are differentiated based on the USB receiver detector.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Figure 1:
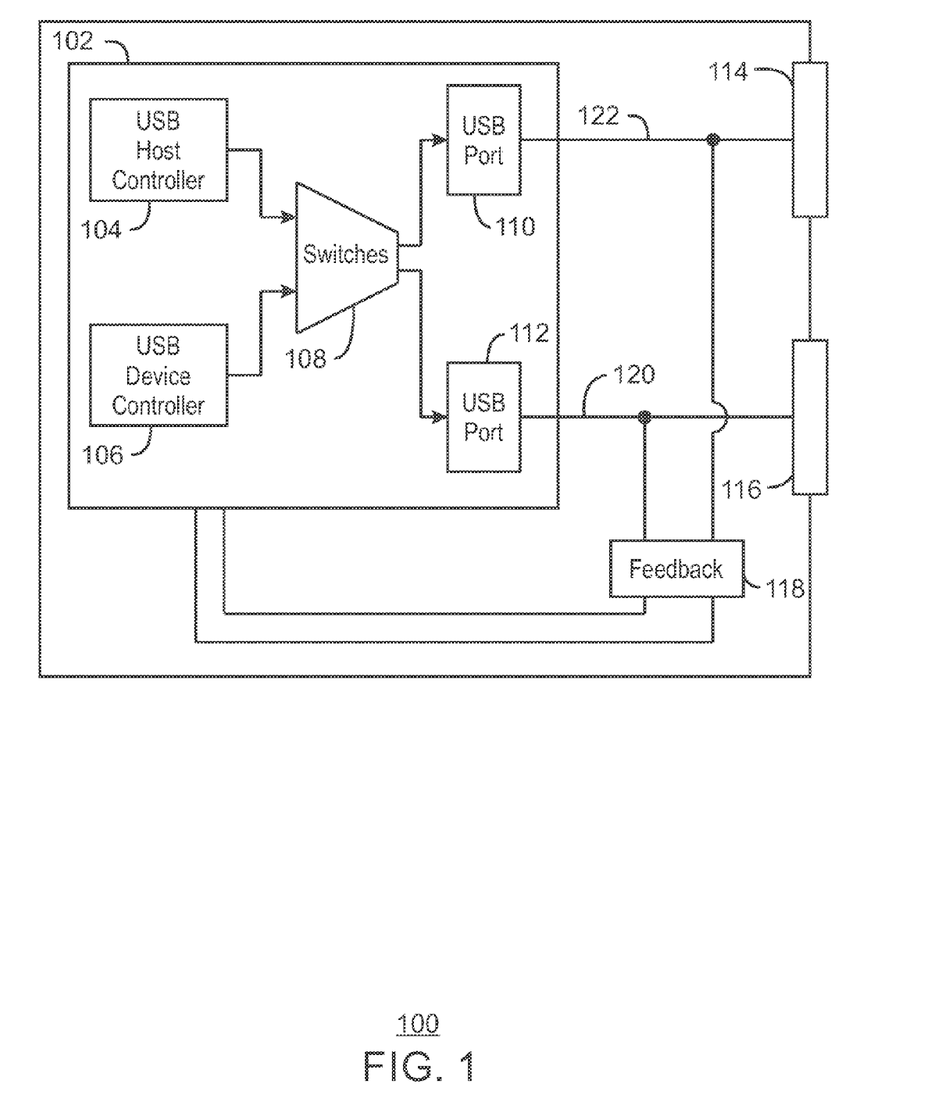
FIG. 1 is a system with shared device controller.

FIG. 1 is a system 100 with shared device controller. The system 100 includes a System on Chip (SOC) 102. In embodiments, instead of an SOC 102, the system 100 may include a platform controller hub (PCH). The system 100 also includes a USB host controller 104 and a USB device controller 106. The USB host controller 104 may include hardware to communicate with a host controller driver as well as hardware to manage signals to and from USB devices configured as a host. The USB host controller 104 may implement power management schemes and support all USB device speeds. Similarly, the USB device controller 106 may include hardware to communicate with a device controller driver as well as hardware to manage signals to and from USB devices configured as a device. The USB device controller 106 may implement power management schemes and support all USB device speeds.

The USB host controller 104 and the USB device controller 106 are coupled with a plurality of switches 108. In embodiments, the switches 108 can control which ports are mapped to the USB host controller 104 and which ports are mapped to the USB device controller 106. Accordingly, the switches control a USB port 110 and a USB port 112. Each port supports a variety of USB signals from a USB Type-C receptacle 114 and a USB Type-C receptacle 116.

The Type-C receptacles may include SuperSpeed USB pins, USB 2.0 pins, Auxiliary Signal Pins, Power Pins, Ground Pins, and Configuration Pins. SuperSpeed signals are used to implement USB 3.1 signaling, while the USB 2.0 pins as used to implement USB 2.0 functionality. The Auxiliary Signal Pins may be used to enable sideband signaling. Power pins include Vbus and Vconn. In particular, Vbus is to enable USB cable bus power and is present when a DFP-to-UFP connection across the CC is present. Additionally, Vconn is applied to an unused CC pin to supply power to the local plug. The Ground pin includes a ground return current path, and CC pins are used to detect connections and configure the interface across the USB Type-C cables and connectors. Type-C pins and signaling is further described in the USB Type-C Specification.

A feedback mechanism 118 can access USB signals 120 and USB signals 122 and provide feedback to the SOC 102. In embodiments, the feedback mechanism 118 provides feedback to the USB device controller 106. Particularly, the device controller 106 may access feedback from the CC pins of the USB Type-C connection in order to determine the type of device coupled with each USB port 110 and 112.

Figure 2:
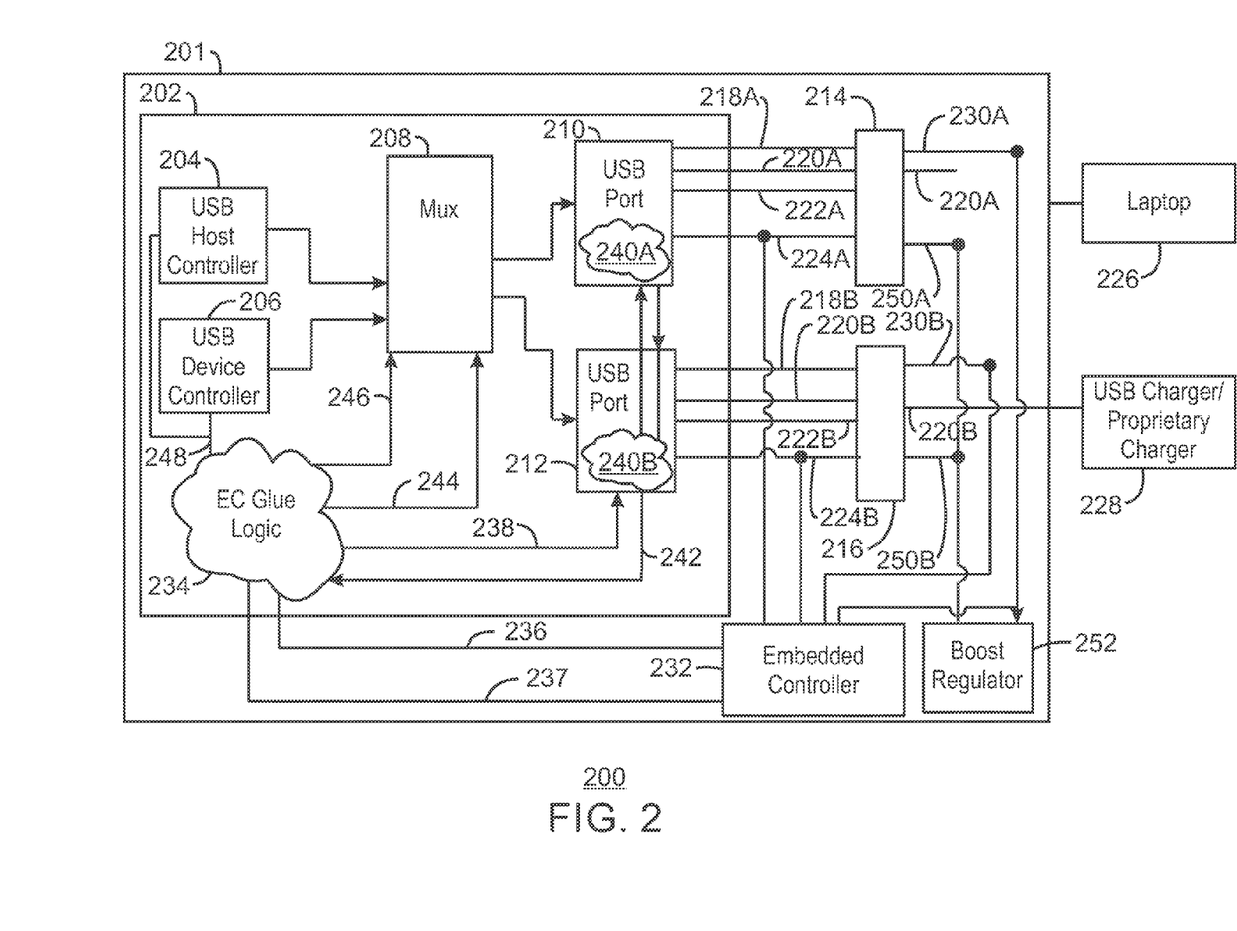
FIG. 2 is a system including a shared device controller.

FIG. 2 is a system 200 including a shared device controller. A platform 201 includes a USB host controller 204 and a USB device controller 206. The USB host controller 204 may include hardware to communicate with a host controller driver as well as hardware to manage signals to and from USB devices. The USB host controller may implement power management schemes and support all USB device speeds. Similarly, the USB device controller 206 may include hardware to communicate with a device controller driver as well as hardware to manage signals to and from USB devices. The USB host controller may implement power management schemes and support all USB device speeds.

In embodiments, the device controller 206 described herein is an eXtensible Device Controller Interface (xDCI), where the xDCI is a USB extended device class controller. In particular, the xDCI may be a register-level device controller interface for any Universal Serial Bus Specification, such as the USB Specification Revision 3.1, released Jul. 26, 2013. The xDCI may also describe a hardware/software interface between system software and the device controller hardware. In embodiments, the xDCI enables a power efficient interface between system software and the device controller hardware according to the USB Power Delivery Specification Revision 2.0, V1.0, released Aug. 11, 2014.

The host controller 204 and the device controller 206 are coupled with a multiplexer 208. The multiplexer 208 connects the host controller 204 and the device controller 206 with a USB Port 210 and a USB Port 212. The USB Port 210 may be coupled with a USB Type-C receptacle 214. Similarly, the USB Port 212 may be coupled with a USB Type-C receptacle 216. Each port supports a variety of USB signals from the USB port. Although certain signals and pins are described in this application, the present techniques may use any Type-C signal as described by the USB Type-C Specification.

In particular, a SuperSpeed differential pair (SSRXP1 and SSRXN1) 218A enables SuperSpeed support from the USB Port 210, and a SuperSpeed differential pair (SSRXP1 and SSRXN1) 218B enables SuperSpeed support from the USB Port 212. A USB 2.0 differential pair (Dp1 and Dn1) 220A enables support for USB 2.0 signaling at the USB port 210, and a USB 2.0 differential pair (Dp1 and Dn1) 220B enables support for USB 2.0 signaling at the USB port 212. A second SuperSpeed differential pair (SSRXP1 and SSRXN1) 222A enables SuperSpeed support from the USB Port 210, and a SuperSpeed differential pair (SSRXP1 and SSRXN1) 222B enables SuperSpeed support from the USB Port 212. A configuration channel (CC) signal 224A and a CC signal 224B are used to determine the relationship between the platform 201 and the device connected via the respective Type-C connector and receptacle combination. In other words, the CC signal is used to determine if a USB port is to be configured to support a host, device, hub, proprietary device, or any other USB device. The USB Type-C receptacle 214 transmits a CC signal 224A and a CC signal 230A.

Additionally, the USB Type-C receptacle 216 transmits a CC signal 224B and a CC signal 230B. The USB Type-C receptacle 214 and the USB Type-C receptacle 216 can receive a Type-C connector inserted in either a right-side-up or upside-down position, thereby enabling multiple orientations of the connector. Accordingly, although all signal pins are not described, two sets of signal pins are present to enable the flipping feature of the Type-C as described in the USB Type-C Specification.

In FIG. 2, a laptop 226 is to be coupled with the USB Type-C receptacle 214, and a simple charger 228 is to be coupled with the USB Type-C receptacle 216. In embodiments, the simple charger may be a USB charger or a proprietary charger. In an example, the simple charger 228 is coupled with the platform 201 via the USB Type-C receptacle 216 prior to the laptop 226 being coupled with the platform 201 via the USB Type-C receptacle 214. In such a scenario, a configuration channel (CC) signal 230B is used by the embedded controller glue logic 234 to configure the physical layer (PHY) of the USB host controller or the USB device controller. The host or device mode is based on the configuration channel pins as defined in the USB Type-C Specification. A charger, such as the simple charger 228, will indicate configuration as a device. Since the CC signal indicates a configuration of the charger 228 in device mode, the device controller 206 is mapped to the charger 228 via the embedded controller glue logic 234. Such a configuration is indicated by the differential pair 220B being coupled with the charger 228. This coupling represents the ability of the charger 228 to transmit data across the differential pair 220B. Although the differential pair 220B is used to illustrate a data connection to the simple charger, any differential pair can be mapped to the simple charger 228 when the charger 228 is mapped to the device controller 206.

When a CC 230A or the CC230B is asserted as described in the USB Type-C Specification, the embedded controller glue logic 234 makes a determination that a connection has occurred at a particular port. In embodiments, the embedded controller 232 samples the CC 230A or the CC230B to obtain information so the embedded controller glue logic 234 can determine which port is detected. The embedded controller glue logic 234 communicates with the embedded controller 232 at the PHY level. In embodiments, the PHY indicates to the embedded controller 232 the configuration of the connected port.

After detection is complete, a state of the SOC 202 is sampled by the embedded controller through an I2C line 236. An alert line 237 between the embedded controller 232 and the embedded controller glue logic 234 provides an indication for the embedded controller glue logic 234 to enter a wait state. In embodiments, several features of the embedded controller glue logic 234 may be turned off or placed in a wait state to conserve power, while a portion of the embedded controller glue logic 234 remains fully powered. Once there is an alert 237 at the embedded controller glue logic 234 from the embedded controller 232, the remainder of the glue logic is awakened. A Vbus 250A and a Vbus 250B driven by a boost regulator 252 to supply power. In embodiments, the boost regulator 252 is enabled by the embedded controller 232.

A driver enable port line 238 provides drivers to support the USB Type-C port 210 when CC 224A and CC 230A indicate a connection to a device. The driver enable port line 238 also provides drivers to support the USB Type-C port 212 when CC 224B and CC 230B indicate a connection to a device. After the connected port is determined, the port state is sampled by the PHY glue logic 240A or the PHY glue logic 240B, depending on the particular port that is connected. The line state port line 242 is used to send the port state from the USB Type-C port 210 or the USB Type-C port 212 to the embedded controller glue logic 234.

A software control line 244 is input to the multiplexer to assign or map the host controller or device controller to a particular USB port. Additionally, a host device control line 246 is also input into the multiplexer 208 to assign the host controller or the device controller to a USB particular port. A status line 248 is an indication from the embedded controller glue logic 234 as to what port the host controller 204 and the device controller 206 are currently assigned. In examples, when a negotiation of controller assignment is in progress between each port, the device controller may not be assigned. The status line 248 provides additional information to the device controller on the particular port assignment. This information is also sent to the host controller.

The multiplexer 208 enables any combination of a USB host or a USB device to be selected for USB Type-C port 210 or USB Type-C port 212. The multiplexer bases determination on the software control 244 and the host device control enable 246. In embodiments, the software control 244 may control a first switch while the host device control enable 246 controls a second switch.

When a subsequent host or remote host is coupled with the platform 201, after the simple charger 228 is coupled with the platform 201, a charger detection process is used to determine if a port is connected to a charger. After the charger is distinguished from a device, the device controller 206 is re-mapped from the charger to the device, as the charger does not require a mapping to the device controller for proper operation.

Figure 3:
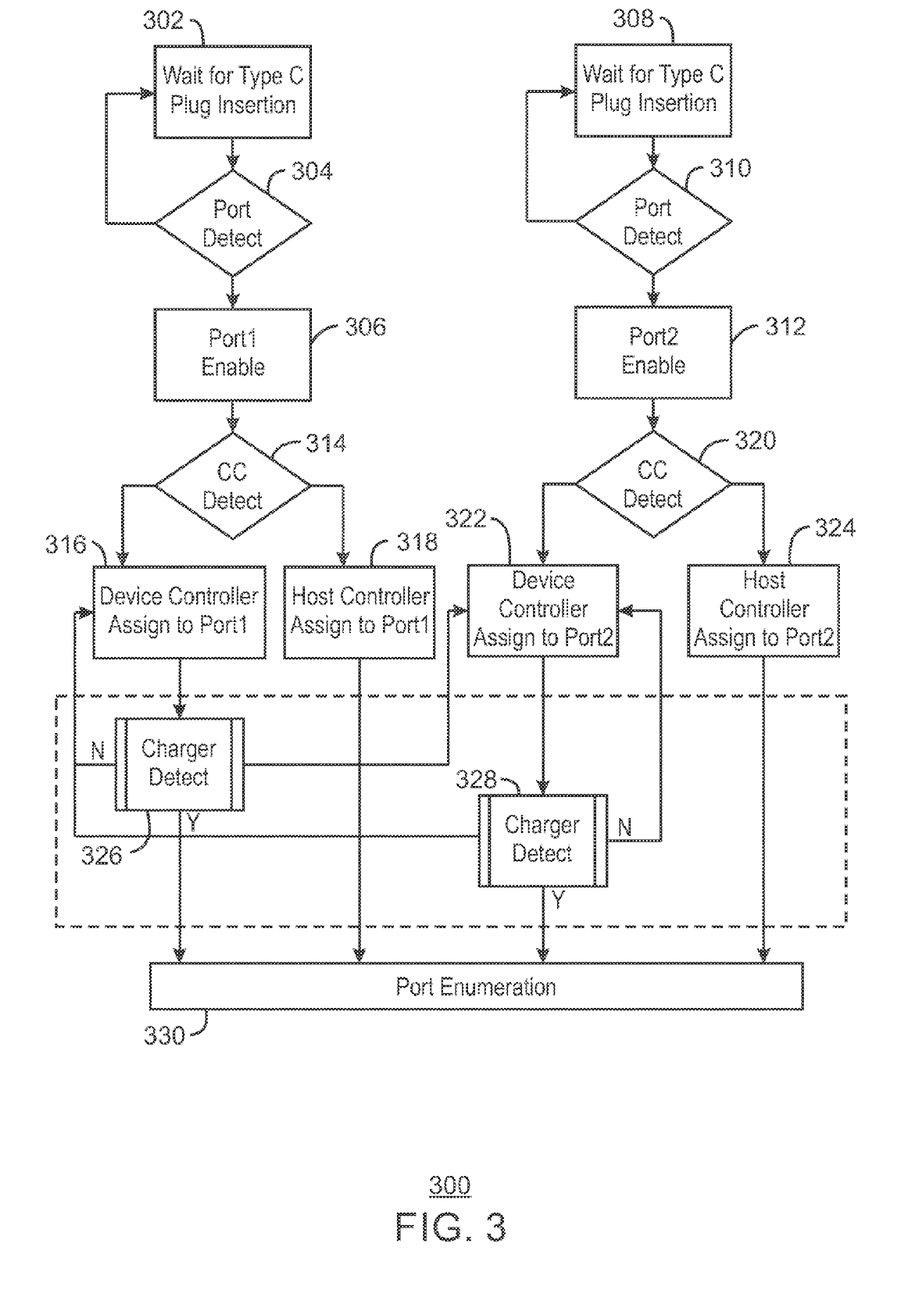
FIG. 3 is a process flow diagram of detecting a charger and a host for a USB Type-C connector.

FIG. 3 is a process flow diagram of detecting a charger and a host for a USB Type-C connector. In embodiments, the presence of a device mode at a USB Type-C port is detected. In response to a USB Type-C port entering device mode, a USB receiver detector is enabled. A weak driver is also enabled. A charger, a host, or remote host can be differentiated at each port based upon detection of USB receiver detector states.

At block 302, a wait for Type-C plug insertion at a first port occurs at block 302. At block 304, port detection occurs at a first port. In embodiments, the first port samples the CC lines of a first Type-C receptacle to determine if a charger, host, or remote host is coupled with the first port. At block 306, a port 1 is enabled when a charger or remote host is connected to port 1. The same process occurs at port 2. Similarly, at block 308, a wait for Type-C plug insertion at a second port occurs. At block 310, port detection occurs at the second port. In embodiments, the second port samples the CC lines of a second Type-C receptacle to determine if a charger, host, or remote host is coupled with port 1. At block 312, port 2 is enabled when a charger, host, or remote host is connected to port 2.

At block 314, CC detection occurs for port 1. If the CC signals from port 1 indicate a charger or a device attached, the device controller is assigned to port 1 at block 316. If the CC signals from port 1 indicate a host attached at the first Type-C receptacle, the host controller is assigned to port 1 at block 318. Similarly, at block 320, CC detection occurs for port 2. If the CC signals from port 2 indicate a charger or a device attached, the device controller is assigned to port 2 at block 322. If the CC signals from port 2 indicate a host attached at the second Type-C receptacle, the host controller is assigned to port 2 at block 324. For ease of description, a system with two USB Type-C receptacles is described herein. However, and number of USB ports may be present.

After the device controller assignment at block 316 and block 322, the charger detection process begins when a port is assigned to the shared device controller. In particular, a charger detection process at block 326 determines if a charger is detected at port 1. If a charger is detected at port 1 and port 2 is enabled, process flow continues to block 322 where the device controller is assigned to port 2. As a result, a simple charger coupled with port 1 is not mapped to the device controller, and the device controller is free for assignment to other ports of the system. If a charger is detected at port 1 and port 2 is not enabled, process flow continues to block 330. If a charger is not detected at port 1, process flow returns to block 316.

Similarly, at port 2, a charger detection process at block 328 determines if a charger is detected at port 2. If a charger is detected at port 2 and port 1 is enabled, process flow continues to block 316 where the device controller is assigned to port 1. As a result, a simple charger coupled with port 2 is not mapped to the device controller, and the device controller is free for assignment to other ports of the system. If a charger is detected at port 2 and port 1 is not enabled, process flow continues to block 330. If a charger is not detected, process flow returns to block 322. At block 330, port enumeration occurs. In embodiments, port enumeration includes loading the drivers associated with the connected USB host or device through detection and identification of the component connected through the USB port.

Figure 4:
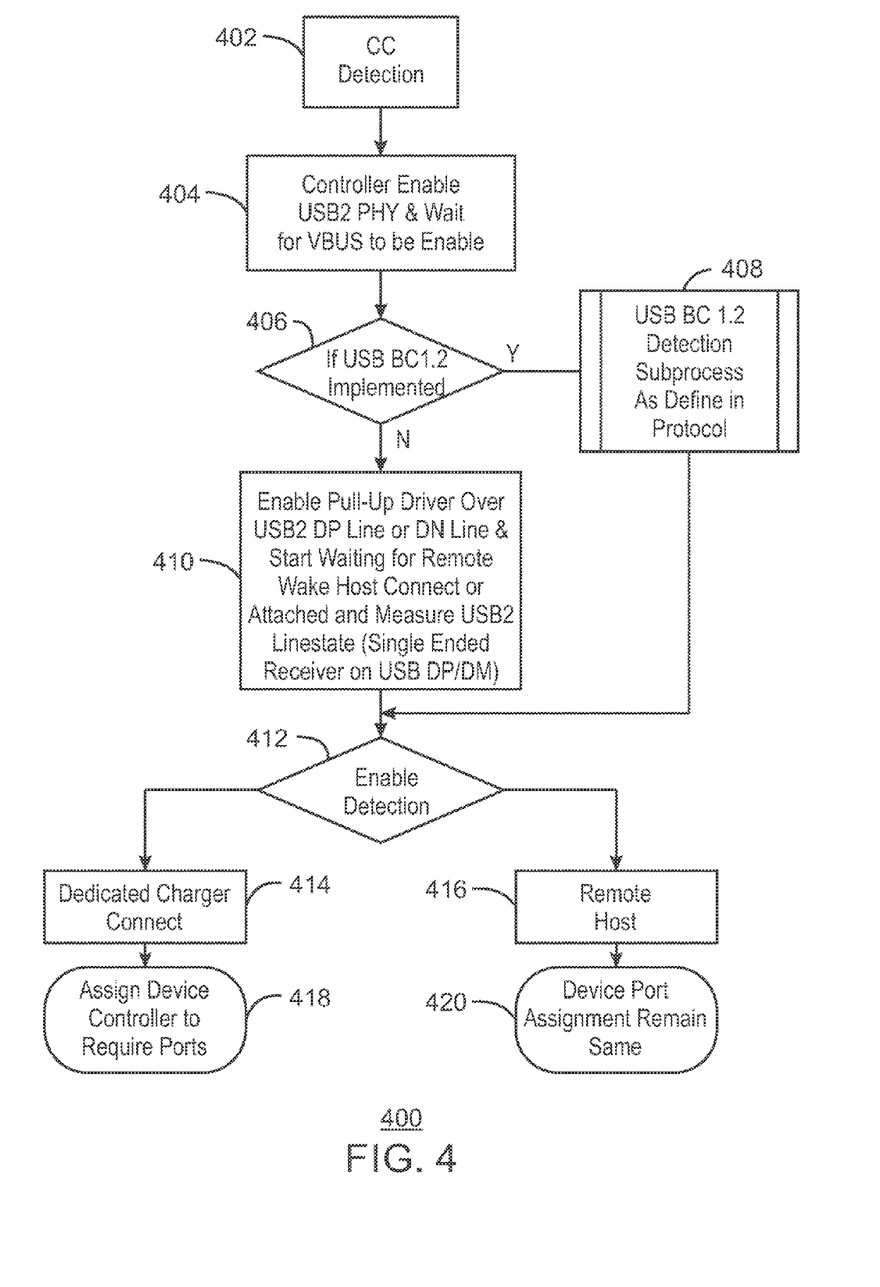
FIG. 4 is a process flow diagram of a charger detection process.

FIG. 4 is a process flow diagram of a charger detection process 400. At block 402, CC detection occurs at a USB receptacle. The CC pins asserted vary depending on the component coupled with the port. In embodiments, the embedded controller configures the PHY and controller in a host controller or device controller mode based on CC detection pins as define in Type-C Specification. If CC pins indicate a connection to a device, the corresponding port is enabled and configured in device mode. The corresponding port may be configured through switches or a multiplexer which controls mapping of device controller or host controller to the particular port.

At block 404, a controller is to enable USB2 PHY and wait for Vbus to be enabled. A Vbus wait indication is used for several reasons, such as to comply with USB protocol and to ensure that Vbus is active, and then the internal supply will be on and a state machine may be enabled. In embodiments, the embedded controller places the glue logic in a wait state, including the embedded controller glue logic and the PHY glue logic of each USB port. At block 406, it is determined if charging according to the USB Battery Charging Specification 1.2, released Dec. 7, 2010 is implemented by the device. If USB BC1.2 is implemented on the detected device, the USB BC 1.2 detection subprocess is performed as defined by the USB BC1.2 Specification at block 408. If USB BC1.2 is not implemented on the detected device, process flow continues to block 410. In embodiments, legacy components may implement USB battery charging that may interfere with signaling and negotiation of the of the Dp and Dn line as described with respect to block 410. If battery charging is implemented, block 410 may be bypassed. When battery charging is implemented, detection of a connected device is performed according to the USB Battery Charging 1.2 Specification.

At block 410, upon detection of voltage on the Vbus, the device controller enables a pull-up driver. In particular, the pull-up driver is enabled over the USB Dp or Dn line. The USB Dp or Dn line may be a Dp or Dn line that forms a differential pair 220A or 220B as described with respect FIG. 2. The device controller also begins sampling its single ended receiver state line state. By sampling, the device controller checks the state of the line after a predetermined amount of time. In embodiments, the line state is filtered to remove noise that may cause a glitch on the line that gives a glitch to the controller. Sampling also enables the receiver for a certain amount of time so that power is saved and the receiver is efficiently operated.

Glue logic then begins to wait for a remote wake host connect or host attached. The USB line state is then measured USB2 line state (single ended receiver on USB DP/DM). At block 412, detection of the line state is enabled. If the line state is 2'b11, process flow continues to block 414. A line state of 2' b11 indicates the connected component does not have power delivery controller capability. If the line state is 2'b10 or 2'b01, process flow continues to block 416. A line state of 2'b01 is to enable a pull-up driver over Dp, while a line state of 2'b10 is to enable pull-up driver over Dn. Based on the line state detected at block 412, the device controller may map or re-map to a Type-C port. For example, in a system that includes two USB Type-C ports, if the device controller is initially mapped to port 1 it may be re-mapped to port 2.

At block 414, the detected device is connected to its respective port as a dedicated or simple charger. At block 418, the device controller is assigned or remapped to other ports that require the device controller. At block 416, the detected device is connected as a remote host. At block 420, the device port assignment remains the same.

In embodiments, enumeration is performed and the device controller is assigned or mapped to one port, such as in a boot or start-up scenario. The charger detect process can then be performed whenever a component is disconnected or connected to a Type-C USB port of the system. Accordingly, each time a Type-C device is plugged into the system, the charger detection process may be performed. Moreover, upon completion of mapping Type-C ports to the device controller, ports enumeration or side communication over CC may begin.

Figure 5:
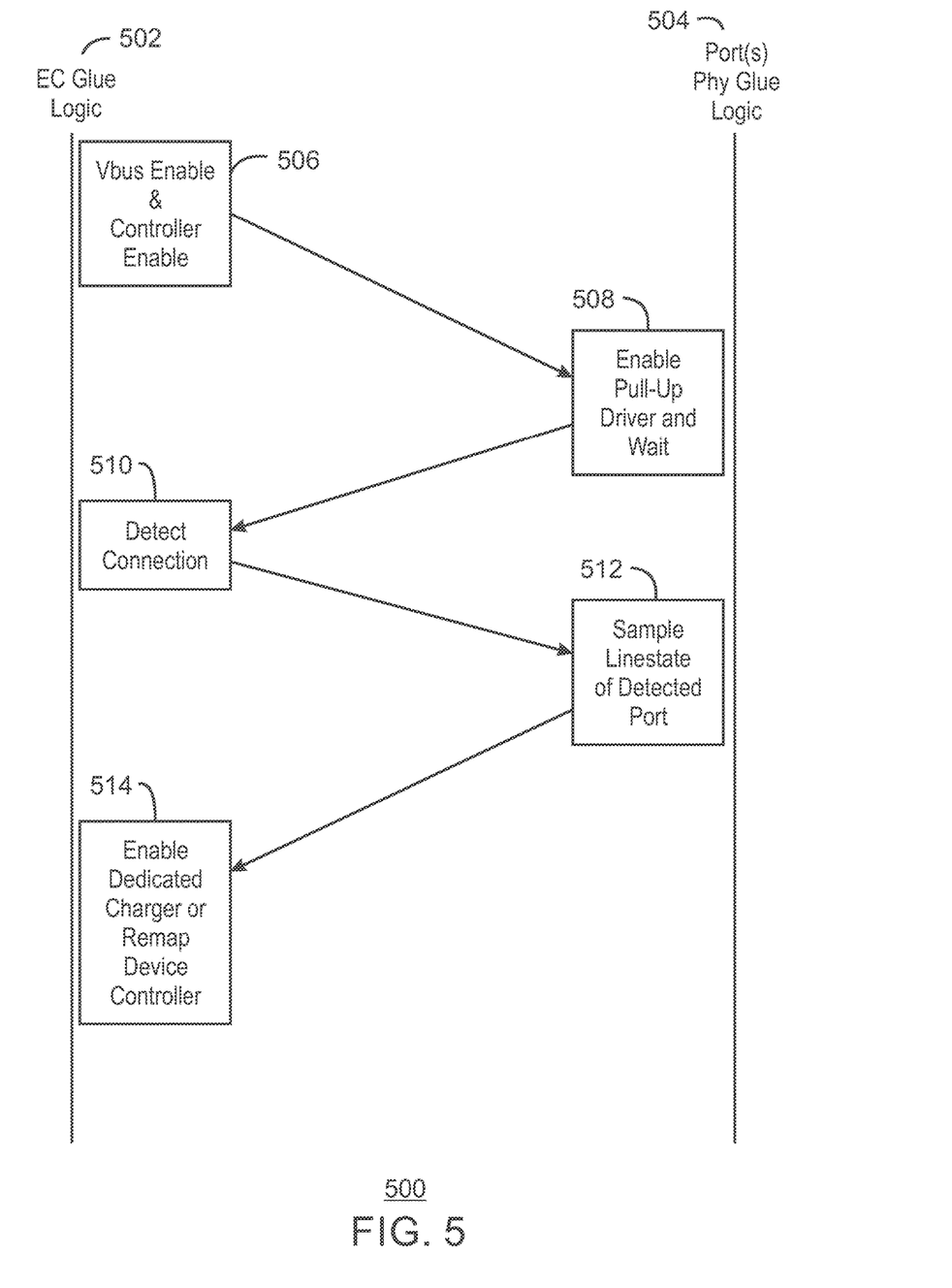
FIG. 5 is a ladder diagram illustrating communication between an embedded controller glue logic and a Type-C port glue logic.

FIG. 5 is a ladder diagram illustrating communication between an embedded controller glue logic and a Type-C port glue logic. The embedded controller glue logic 502 and the port glue logic 504 may be used to map or re-map a port to a device controller. At block 506, the Vbus is enabled and sampling by the device controller is enabled. At block 504, a port PHY glue logic enables a pull-up driver over the USB Dp or Dn line. In embodiments, a CC detects pull up and pull down to detect a host or device connected to a port, or for sideband communication. In embodiments, when a host is connected to a port, a host component creates a strong pull down of approximately 15 kohm to the ground. If a device is connected to a port, there is a weak pull up of the 400 ohm on Dp or DN. However, a simple charger does not have a weak pull down on the DP and DN. As a result, when a charger is coupled with a port, the configuration channel pins may indicate a logic value of "11." When a host is couple with a port, the configuration channel pins may indicate a logic value of "00," as the host has a weak pull down on the Dp and Dn signal lines. The values may be sensed by a receiver circuit that associated with the Dp and Dn lines of each port.

At block 510, a connection is detected based on values at the configuration channel lines of each port. At block 512, the line state of the detected port is sampled by the PHY glue logic of the port. At block 514, the embedded controller enables a dedicated charger connection or remaps the device controller. In embodiments, glue logic will determine if the connected component is a charger or a host. If the component is a charger, a dedicated charger connection is made at the port and the device controller can be remapped to another port.

In embodiments, the simple charger does not have any host capability and the device controller (xDCI) controller is effectively connected or tied up without the charger detection process described in reference to FIG. 4 and FIG. 5, as the device controller will remain mapped to the port coupled with the charger until the charger is disconnected. If the user subsequently connects another USB Type-C port to a remote host, USB device functionality will not be available since the controller has already been mapped to the port that is connected to the charger. There is also another scenario where USB battery charger detector also implemented along with USB type-C; in such a scenario contention is created since battery charging detection will negotiating with a charger or a host. The present techniques can resolve this conflict or contention by differentiating between a charger and remote host, with or without USB battery charging, implemented at platform level.

In embodiments, a device may include several USB data ports that can operate as a downstream facing port (DFP) or an upstream facing port (UFP). The type of port may be dynamic and can alternate between a DFP or a UFP as negotiated by the devices. A DFP is typically associated with ports on a host or ports on the hub to which devices are connected. In its initial state, the DFP sources VBUS and VCONN, and supports data. A charge only DFP only sources VBUS. A UFP is a port on a device or a hub that connects a host or the DFP of a hub. In its initial state, the UFP sinks VBUS and supports data.

In embodiments, configuration of a relationship between two ports (into DFP or UFP) is determined via a configuration channel (CC). The configuration channel (CC) can be used in the discovery, configuration, and management of connections across a USB Type-C cable. Moreover, the CC can be used to set up and manage power and Alternate/Accessory Modes. In some cases, the USB Type-C interconnect can shift the USB PD communication protocol from being communicated over the VBUS to being delivered across the USB Type-C configuration channel.

A USB Type-C connector may include two pins, CC1 and CC2, used to configure a DFP-to-UFP connection. DFP-to-UFP attach is detected by a host or hub port (DFP) when one of the CC pins at its USB Type-C receptacle senses a specified resistance to GND. Subsequently, DFP-to-UFP detach is detected when the CC pin that was terminated at its USB Type-C receptacle is no longer terminated to GND.

Power is not applied to the USB Type-C host or hub receptacle (VBUS or VCONN) until the DFP detects the presence of an attached device (UFP) port. When a DFP-to-UFP attach is detected, the DFP is expected to enable power to the receptacle and proceed to normal USB operation with the attached device. When a DFP-to-UFP detach is detected, the port sourcing VBUS removes power.

Figure 6:
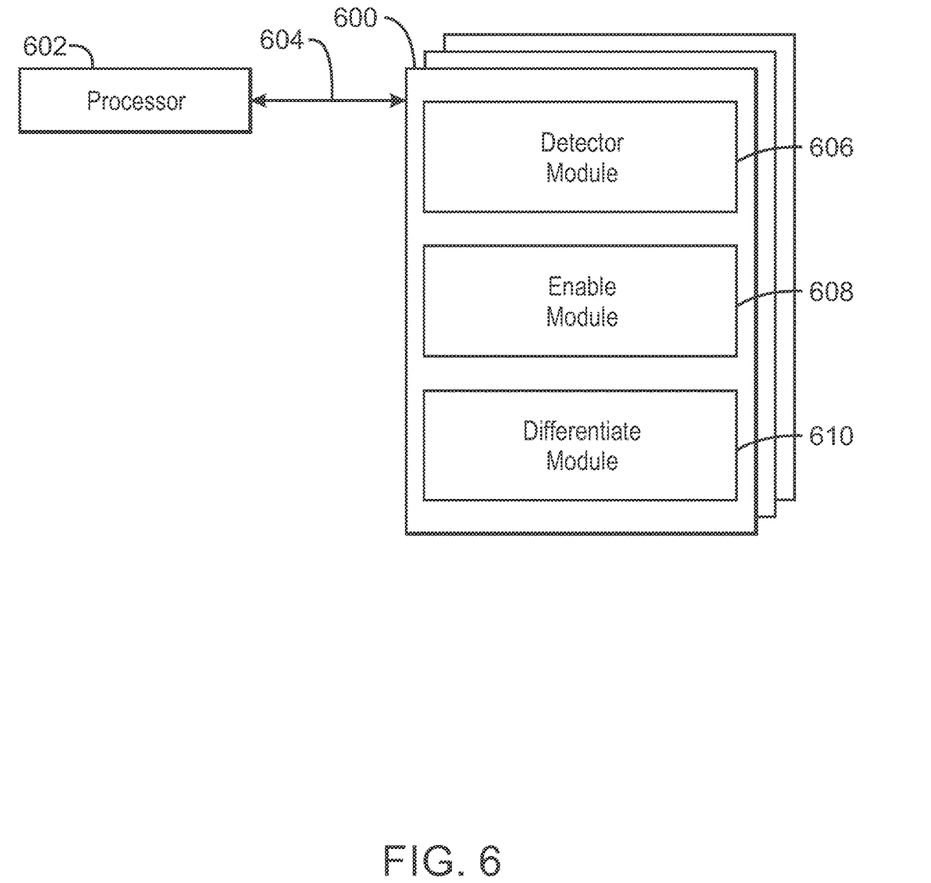
FIG. 6 is a block diagram showing a tangible, non-transitory computer-readable media that stores code for distinguishing between a charger and a USB Type-C host.

FIG. 6 is a block diagram showing a tangible, non-transitory computer-readable media 600 that stores code for distinguishing between a charger and a USB Type-C host. The tangible, non-transitory computer-readable media 600 may be accessed by a processor 602 over a computer bus 604. Furthermore, the tangible, non-transitory computer-readable medium 600 may include code configured to direct the processor 602 to perform the methods described herein.

The various software components discussed herein may be stored on one or more tangible, non-transitory computer-readable media 600, as indicated in FIG. 6. For example, a detector module 606 may be configured to detect a component's connection to a Type-C port of a system. An enable module 608 may be configured to enable a connection between the device controller and a port. At block 610, the differentiate module distinguishes between a charger and a USB Type-C host in a charger detection process, such as the charger detection process described with respect to FIG. 4.

The block diagram of FIG. 6 is not intended to indicate that the tangible, non-transitory computer-readable media 600 is to include all of the components shown in FIG. 6. Further, the tangible, non-transitory computer-readable media 600 may include any number of additional components not shown in FIG. 6, depending on the details of the specific implementation.

Figure 7:
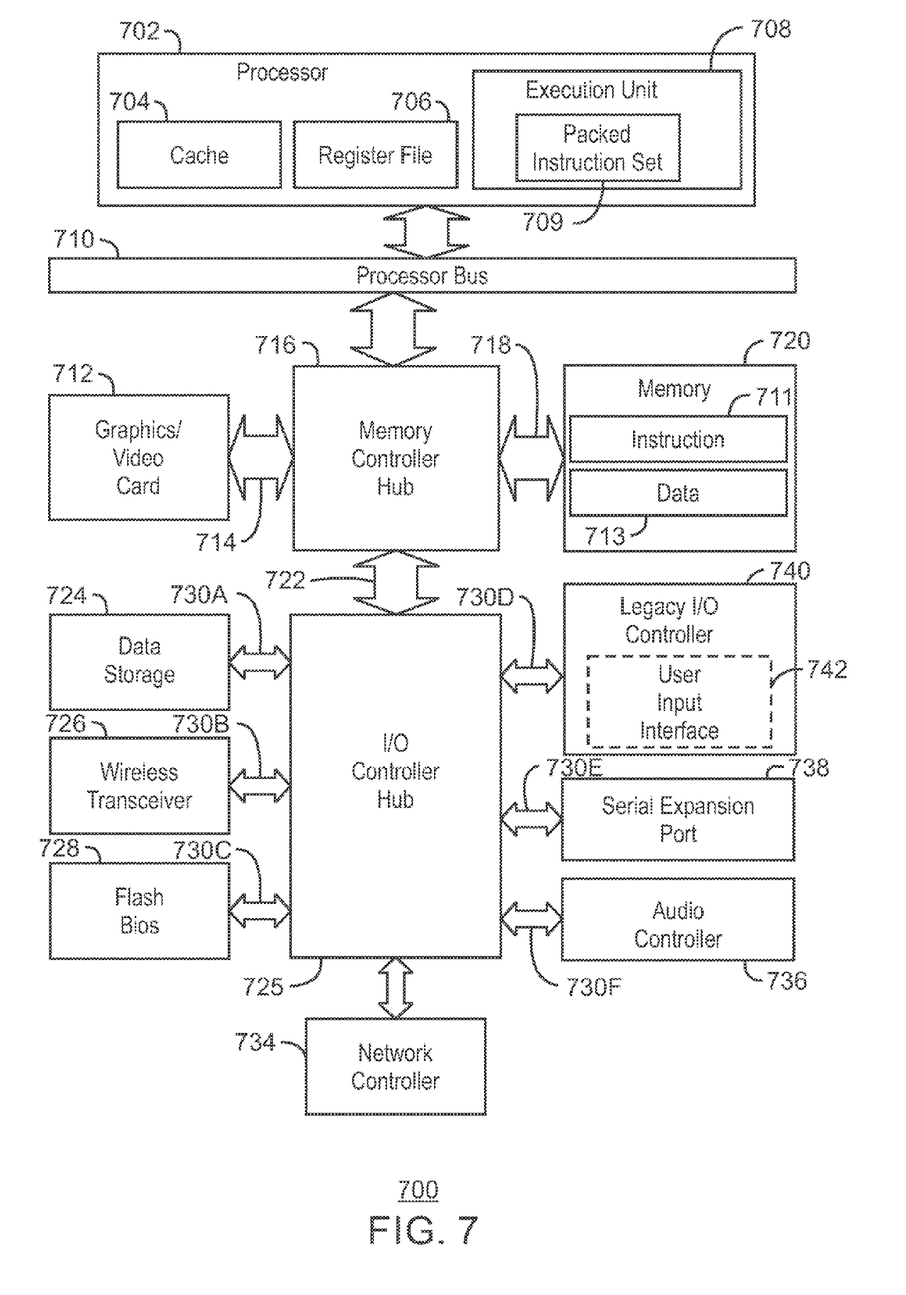
FIG. 7 is a block diagram of an exemplary computer system.

FIG. 7 is a block diagram of an exemplary computer system 700. The system 700 includes a processor with execution units to execute an instruction, where one or more of the interconnects implement one or more features in accordance with one embodiment of the present invention is illustrated. The system 700 includes a component, such as a processor 702 to employ execution units 708 including logic to perform algorithms for process data, in accordance with the present invention, such as in the embodiment described herein. In some cases, system 700 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In embodiments, system 700 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

The embodiments described herein are not limited to computer systems. Alternative embodiments of the present techniques can be used in other devices, such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 702 includes one or more execution units 708 to implement an algorithm that is to perform at least one instruction 711. One embodiment may be described in the context of a single processor desktop or server system, but alternative embodiments may be included in a multiprocessor system. System 700 is an example of a 'hub' system architecture. The computer system 700 includes a processor 702 to process data signals. The processor 702, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 702 is coupled to a processor bus 710 that transmits data signals between the processor 702 and other components in the system 700. The elements of system 700 (e.g. graphics accelerator 712, memory controller hub 716, memory 720, I/O controller hub 725, wireless transceiver 726, Flash BIOS 728, Network controller 709, Audio controller 736, Serial expansion port 738, I/O controller 740, etc.) perform their conventional functions that are well known to those familiar with the art.

In one embodiment, the processor 702 includes a Level 1 (L1) internal cache memory 704. Depending on the architecture, the processor 702 may have a single internal cache or multiple levels of internal caches. Other embodiments include a combination of both internal and external caches depending on the particular implementation and needs. Register file 706 is to store different types of data in various registers including integer registers, floating point registers, vector registers, banked registers, shadow registers, checkpoint registers, status registers, and instruction pointer register.

Execution unit 708, including logic to perform integer and floating point operations, also resides in the processor 702. The processor 702, in one embodiment, includes a microcode (ucode) ROM to store microcode, which when executed, is to perform algorithms for certain macroinstructions or handle complex scenarios. Here, microcode is potentially updateable to handle logic bugs/fixes for processor 702. For one embodiment, execution unit 708 includes logic to handle a packed instruction set 709. By including the packed instruction set 709 in the instruction set of a general-purpose processor 702, along with associated circuitry to execute the instructions, the operations used by many multimedia applications may be performed using packed data in a general-purpose processor 702. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 708 may also be used in micro controllers, embedded processors, graphics devices, DSPs, and other types of logic circuits. System 700 includes a memory 720. Memory 720 includes a dynamic random access memory (DRAM) device, a static random access memory (SRAM) device, flash memory device, or other memory device. Memory 720 stores instructions 711 and/or data 713 represented by data signals that are to be executed by the processor 702.

Note that any of the aforementioned features or aspects of the present techniques may be utilized on one or more interconnects illustrated in FIG. 7. For example, an on-die interconnect (ODI), which is not shown, for coupling internal units of processor 702 implements one or more aspects of the invention described above. The invention is associated with a processor bus 710 (e.g. Intel Quick Path Interconnect (QPI) or other known high performance computing interconnect), a high bandwidth memory path 718 to memory 720, a point-to-point link to graphics accelerator 714 (e.g. a Peripheral Component Interconnect express (PCIe) compliant fabric), a controller hub interconnect 722, and an I/O or other interconnect (e.g. USB, PCI, PCIe) 730A, 730B, 730C, 730D, 730E, and 730F for coupling the other illustrated components. Some examples of such components include the audio controller 736, firmware hub (flash BIOS) 728, wireless transceiver 726, data storage 724, legacy I/O controller 710 containing user input and keyboard interfaces 742, a serial expansion port 738 such as Universal Serial Bus (USB), and a network controller 709. The data storage device 724 can comprise a hard disk drive, a floppy disk drive, a CD-ROM device, a flash memory device, or other mass storage device.

The block diagram of FIG. 7 is not intended to indicate that the computing device 700 is to include all of the components shown in FIG. 7. Further, the computing device 700 may include any number of additional components not shown in FIG. 7, depending on the details of the specific implementation.

EXAMPLE 1

An apparatus is described herein. The apparatus comprises a USB Type-C port and a USB receiver detector. A charger and a remote host are differentiated based on the USB receiver detector.

The device controller may be shared among a plurality of USB Type-C ports. The device controller may also be assigned to a port of the plurality of USB Type-C ports based on a USB receiver detector state. Further, an embedded controller may map the device controller to a port of the plurality of USB Type-C ports. Embedded controller glue logic may configure the physical layer (PHY) of the device controller. Moreover, PHY glue logic may determine a state of the USB Type-C port. The charger may not map to data lanes of the USB Type-C port. Additionally, the charger may be differentiated from the remote host with implementing sideband signaling. The charger may also to present itself as a downstream facing port, and the charger does may not have host functionality. Additionally, the multi-mode port may be a USB Type-C port.

EXAMPLE 2

A system is described herein. The system comprises a shared device controller, a plurality of multi-mode ports, and a USB receiver detector. At least one charger is coupled to a first port, and at least one remote host is coupled to a second port. A charger and a remote host are differentiated based on the USB receiver detector.

The device controller may be shared among a plurality of multi-mode ports. The device controller may also be mapped to a port of the plurality of multi-mode ports based on a USB receiver detector state. The embedded controller may map the device controller to a port of the plurality of multi-mode ports. The system may also include embedded controller glue logic, wherein the embedded controller glue logic may configure the physical layer (PHY) of the device controller. A PHY glue logic may determine a state of the multi-mode port. The charger may not map to data lanes of the multi-mode port. Further, the charger may be differentiated from the remote host with implementing sideband signaling. The charger may present itself as a downstream facing port. Also, the charger may not have host functionality. The multi-mode port may be a multi-mode port.

EXAMPLE 3

A method is described herein. The method includes detecting a presence of a device mode at a USB Type-C port, and enabling a USB receiver detector. The method also includes enabling a weak driver, and differentiating between a charger and a remote based on USB receiver detector states.

The device mode may be detected based on configuration channel pins. A charger may be detected based on a line state. Additionally, a charger may be detected when a pull up driver is enabled on a Dp or a Dn line. Further, the device controller may be remapped to another port when a charger is detected. Additionally, the multi-mode port may be a USB Type-C port.

EXAMPLE 4

A non-transitory, computer readable medium is described herein. The non-transitory, computer readable medium comprises code to direct a processor to detect a presence of a device mode at a multi-mode port and enable a USB receiver detector. The code also directs the processor to enable a weak driver and differentiate between a charger and a remote based on USB receiver detector states.

The device mode may be detected based on configuration channel pins. A charger may be detected based on a line state. A charger may also be detected when a pull up driver is enabled on a Dp or a Dn line. The device controller may be remapped to another port when a charger is detected. Moreover, the multi-mode port may be a USB Type-C port.

EXAMPLE 5

An apparatus is described herein. The apparatus comprises a multi-mode port and a means for distinguishing between a charger and a remote host, wherein the means for distinguishing between a charger and a remote host is in a plurality of states.

The apparatus may also include a device controller, wherein the device controller is shared among a plurality of multi-mode ports. The device controller may be assigned to a port of the plurality of multi-mode ports based on a state of the means for distinguishing between a charger and a remote host. An embedded controller may map the device controller to a port of the plurality of multi-mode ports. The apparatus may also include embedded controller glue logic, wherein the embedded controller glue logic is to configure the physical layer (PHY) of the device controller. Additionally, PHY glue logic may determine a state of the means for distinguishing between a charger and a remote host. The charger may not be mapped to data lanes of the multi-mode port. Optionally, the charger may be differentiated from the remote host by implementing sideband signaling. The charger may present itself as a downstream facing port. Further, the charger may not have host functionality. Further, the multi-mode port may be a USB Type-C port.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus, comprising:
   a multi-mode port, wherein the multi-mode port is to transmit and receive data according to multiple protocols, wherein PHY glue logic is to determine a state of the multi-mode port; and
   a USB receiver detector, wherein the receiver detector is to differentiate between a charger and a remote host on the USB receiver detector.

2. The apparatus of claim 1, comprising:
   a device controller, wherein the device controller is shared among a plurality of multi-mode ports that comprises the multi-mode port.

3. The apparatus of claim 2, wherein the device controller is assigned to a port of the plurality of multi-mode ports based on a USB receiver detector state.

4. The apparatus of claim 2, wherein an embedded controller is to map the device controller to a port of the plurality of multi-mode ports.

5. The apparatus of claim 2, comprising:
   embedded controller glue logic, wherein the embedded controller glue logic is to configure the physical layer (PHY) of the device controller.

6. The apparatus of claim 1, wherein the charger is not mapped to data lanes of the multi-mode port.

7. The apparatus of claim 1, wherein the charger is differentiated from the remote host by implementing sideband signaling.

8. The apparatus of claim 1, wherein the charger is to present itself as a downstream facing port.

9. The apparatus of claim 8, wherein the multi-mode port is a USB Type-C port.

10. A system, comprising:
a shared device controller;
a plurality of multi-mode ports, wherein at least one charger is coupled to a first port, and at least one remote host is coupled to a second port, and wherein the plurality of multi-mode ports are to transmit and receive data according to multiple protocols and PHY glue logic is to determine a state of the multi-mode port; and
a USB receiver detector, wherein a charger and a remote host are differentiated based on the USB receiver detector.

11. The system of claim 10, wherein the device controller is shared among the plurality of multi-mode ports.

12. The system of claim 10, wherein the device controller is mapped to a port of the plurality of multi-mode ports based on a USB receiver detector state.

13. The system of claim 10, wherein an embedded controller is to map the device controller to a port of the plurality of multi-mode ports.

14. The system of claim 10, comprising:
embedded controller glue logic, wherein the embedded controller glue logic is to configure the physical layer (PHY) of the device controller.

15. The system of claim 10, wherein the charger is not mapped to data lanes of the multi-mode port.

16. The system of claim 10, wherein the charger is differentiated from the remote host by implementing sideband signaling.

17. The system of claim 10, wherein the charger is to present itself as a downstream facing port.

18. The system of claim 17, wherein the charger does not have host functionality.

19. A method, comprising:
detecting a presence of a device mode at a multi-mode port, wherein the multi-mode port is to transmit and receive data according to multiple protocols;
enabling a USB receiver detector;
enabling a weak driver; and
differentiating between a charger and a remote host based on USB receiver detector states, wherein the charger is differentiated from the remote host by implementing sideband signaling.

20. The method of claim 19, comprising detecting the device mode based on configuration channel pins.

21. The method of claim 19, comprising detecting a charger based on a line state.

22. The method of claim 19, comprising detecting a charger when a pull up driver is enabled on a Dp or a Dn line.

23. The method of claim 22, comprising remapping the device controller to another port when a charger is detected.

* * * * *